Patented May 9, 1933

1,908,180

UNITED STATES PATENT OFFICE

RALPH H. PRICE, OF CHICAGO, ILLINOIS, ASSIGNOR TO GLUE RESEARCH CORPORATION, OF NEW YORK, N. Y., A CORPORATION OF NEW YORK

PROCESS OF SURFACE FINISHING

No Drawing. Application filed September 21, 1928. Serial No. 307,556.

My invention relates to processes of and methods for the finishing of surfaces which are ordinarily difficult to finish because of the solvent action of the finishing materials upon the surfaces over which they are applied and it has for one of its objects to provide a means for the satisfactory finishing of surfaces which contain stains or other soluble coloring matters which are dissolved by and discolor the usual finishing materials such as enamels, paints, varnishes and lacquers.

Another object of my invention is to provide a process by which the powerful solvent action of a finishing material, such as lacquer, upon a previous coat of finishing material may be prevented thereby making possible the application of a new coat of material without producing any softening action on the previous coats which might affect the character and appearance of the final finish coat.

It is well known that when paints, varnishes, lacquers, enamels and similar coating compositions are used over asphalt, creosote or similar bituminous materials or over wood which has been stained with certain types of stains, such for example, as those used to produce reddish tones, there is a tendency on the part of the bituminous substance or the stain, as the case may be, to be dissolved by the paint, varnish, lacquer or enamel and to "bleed" into the finish coat. Many expedients for overcoming this bleeding have been tried, such for example, as the use of aluminum paint but none of them, so far as I am aware, has proved successful.

It is also well known that when a lacquer of the nitrocellulose type is applied over paint, varnish or enamel, the solvents in the lacquer soften the paint, varnish or enamel frequently to such a degree that the old finish swells and wrinkles in an unsightly fashion, thus spoiling the entire finish. This action is commonly known as "lifting" of the old finish by the lacquer and in nearly all cases where it occurs it necessitates complete removal of all finishing materials down to the original unfinished surface before satisfactory refinishing can be done.

It is a well known fact that when lacquer is applied directly over a dried coat of lacquer, the solvents in the newly applied lacquer dissolve the previous coat and may cause the new and old coats to mingle to a considerable extent. If the new lacquer coat is of a different color from the lacquer over which it is applied, as is often the case in refinishing, any mingling of colors of the two coats produces an unsightly appearance.

All these deleterious effects which follow the use of paint, varnish, lacquer and enamel on surfaces of the character described above may be prevented by the use of my sealing composition.

I have found that the above difficulties may be eliminated by first applying over the surface to be finished a coating of material which is insoluble in organic solvents and which does not have appreciable solvent action itself upon the material being coated. By "organic solvents" I mean those commonly used in ordinary finishing materials such as lacquers, paints, enamels and varnishes. An ideal material for my purpose is a plasticized glue, by which I mean a mixture of glue and one or more plasticizing or softening agents, such as glycerine, Turkey red oil or other sulfonated vegetable oils, sulfonated mineral oils, polyglycerols or polyglycols. Other coating materials of the same general character can be used, as, for example, casein, starch, dextrin and the like.

An especially efficient and convenient form of composition for this purpose is that described in my copending application Serial No. 73,919. This composition has good adhesive quality and when dry forms a perfect sealing coat since it not only prevents bleeding and makes it possible to finish bituminous surfaces or wood stained with bleeding dyes, in any desired color with any of the ordinary finishing materials, but also prevents the undesirable solvent action of lacquer above described. Without a sealing coat such as I have invented even as many as seven or more coats of white or light colored paint, enamel, or lacquer have been found to be ineffective in sealing in red stains since even the final resulting coat still showed a pinkish discoloration.

By "bleeding" I mean any diffusion of soluble color from dyes or stains such as aniline colors or from a soluble material like creosote, asphalt or pitch. The term is most appropriately used when speaking of red stains such as those commonly used for imitating mahogany but the meaning of the term is not limited as to color since a diffusion of any color produces the same undesirable effect and is known as "bleeding" in this art.

For the purpose herein, it is to be understood that any dyes or substances used for the staining or coating of wood or other surfaces to be decorated are classed as finishing materials.

I prefer to operate my process of sealing as follows: I prepare a solution of plasticized glue in a suitable solvent mixture in the manner described in my copending application Serial No. 73,919. I have found a composition comprising the following ingredients to be very satisfactory as a sealing coat; namely, a composition comprising substantially 35% of water, 38% of alcohol, 7% of glycerine, and 20% of an animal glue of substantially 10 grams jelly test and 20 millipoises viscosity. A glue of even lower grade as regards jelly test and viscosity may be used satisfactorily and, in fact, is to be preferred where the sealing coat is to be used at a temperature considerably below ordinary room temperatures because such a composition can be applied more easily at the lower temperature. It is to be understood that the percentages mentioned herein are percentages by weight and are approximate only, and that the tests for viscosity and jelly strength are those adopted by the National Association of Glue Manufacturers as published in Industrial and Engineering Chemistry, volume 16, number 3, page 310.

In order to impart hiding power to the sealing coat composition and to improve its degree of adhesion to certain types of surfaces, I may add to the composition described above a suitable quantity of white pigment, such as lithopone or titanium pigment, and a quantity of fine silica. Colored pigments may be added if desired in order to tint the sealing coat composition to a shade comparable to the top coat of finishing material that is to be applied thereover. But it is to be understood that these pigments are not essential to the efficiency of the sealing coat.

I have found that substantially 2⅓ times as much pigment as there is of glue and plasticizer combined is a very satisfactory proportion although it is to be understood that this ratio may be varied over a wide range without departing from the scope of this invention.

The material for the sealing coat, prepared in a manner similar to that described above, is now applied to the surface which it is desired to seal. The surface may be roughened with sandpaper, steel wool, or the like if at all glossy, in order to secure best results. When this composition is used for sealing bleeding stains especial care should be used to obtain a continuous film of this sealing coat material, otherwise the film may prove to be excessively porous and will then probably allow "bleeding" of the stain through the small pores where no sealing has been accomplished. Two coats of this material are usually advisable in order to obtain a continuous film. When thoroughly dry, top or finishing coats of any of the usual water insoluble finishing composition, such as paint, varnish, enamel, or lacquer may be applied in the usual manner.

The glue composition constiting the sealing coat herein described may be applied by any of the methods ordinarily used in this art. In spraying it, a certain amount of thinning of the composition may be desirable. A very satisfactory thinner for this purpose consists of equal parts by volume of denatured ethyl alcohol and water.

I claim:

1. The process of sealing stains employed in the art of wood finishing which comprises applying thereto an intermediate coating of glue, glycerin, alcohol and water to prevent the stain beneath it from "bleeding" into coating material subsequently applied.

2. In the art of finishing stained surfaces, the step which comprises applying a drying coating containing animal glue, glycerin, alcohol and water.

In witness whereof, I have hereunto subscribed my name.

RALPH H. PRICE.